United States Patent Office 3,819,733
Patented June 25, 1974

---

3,819,733
PROCESS FOR THE PREPARATION OF NON-CONJUGATED DIENIC GRIGNARD REAGENTS AND THEIR UTILIZATION IN ORGANIC SYNTHESES
Hugh E. Ramsden, Scotch Plains, N.J., assignor to Rhodia, Inc., New York, N.Y.
No Drawing. Filed Mar. 6, 1972, Ser. No. 232,254
Int. Cl. C07f 3/02
U.S. Cl. 260—665 G    11 Claims

ABSTRACT OF THE DISCLOSURE

A process is provided for the preparation of non-conjugated dienic Grignard reagents which are useful in organic syntheses and particularly for the preparation of complex terpenic alcohols, such as lavandulol. A mono conjugated diene magnesium compound and an allyl halide are reacted in the presence of a cyclic ether to form the nonconjugated dienic Grignard reagent. To form a terpenic alcohol such as lavandulol, a mono diene magnesium such as isoprene magnesium and a diene hydrohalide such as prenyl halide are reacted, and the resulting Grignard reagent is then treated with oxygen and hydrolyzed, to form, for example, lavandulol.

---

The organomagnesium halides known as Grignard reagents of the type RMgX are classically prepared by the reaction of the corresponding halide RX with magnesium in an anhydrous organic solvent such as ethyl ether. The very reactive Grignard reagent in turn can be reacted with a variety of reagents to introduce the R substituent into ketones, alcohols, aldehydes, esters, and other organic compounds. Alcohols are formed by insertion of oxygen in the Grignard reagent, resulting in an oxymagnesium halide, which upon hydrolysis yields the corresponding alcohol ROH. This reaction is, however, of little commercial importance, since the alcohol ROH is usually the starting material for the halide RX. On the other hand, when the halide is available, and the alcohol not, the halide can be converted directly to the alcohol and there is no need to proceed by way of the Grignard reagent, which is a more expensive route than other available methods. Therefore, this method is of little practical value.

It has recently been reported (Chemical & Engineering News, Apr. 17, 1967, pp. 46-47, U.S. Pats. Nos. 3,388,179, patented June 11, 1968, and No. 3,642,845, patented Feb. 15, 1972, to Hugh E. Ramsden), that conjugated dienes react with magnesium compounds. Two diene units become linked together, and form a cyclic organomagnesium diene compound which can be hydrolyzed with water to form a diene dimer. The magnesium can be coupled to the dienes at any carbon of the ethylenic double bonds, and since there are four such possible positions on each of two diene units, a large number of isomers can be obtained. In fact, Ramsden reported a mixture containing about 20 isomers, of which the double bond isomers of tail-to-tail products predominate. Not all conjugated dienes react in this way. For instance, 1,3-pentadiene does not react, for reasons which Ramsden could not explain.

Although Ramsden refers to these products as Grignard reagents, in fact they are not true Grignard reagents, because they contain no halide, and because the magnesium is bivalently linked to the two isoprene units in a new hydrocarbon group, instead of monovalently to one hydrocarbon group, as in RMgM. They are true organomagnesium compounds, and undergo the reactions of such compounds, which are different from the reactions of the true Grignard reagents, as these references show. These compounds are generally reactive with compounds that react readily with Grignard reagents but more slowly.

Tatsuo Moroe et al. Japanese patent publication No. 3770/1971, published Jan. 29, 1971, describe a method for preparing organomagnesium compounds, starting with conjugated dienes, and using a Lewis acid as a catalyst. In this method, one mole of the conjugated diene compound becomes bonded bivalently with one atom of metallic magnesium, in the presence of the Lewis acid catalyst, in the following manner:

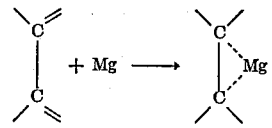

The inventors indicate that the resulting addition compound has a reactivity similar to that of a Grignard reagent, and can be used in various reactions. It does not contain halide in the molecule, since the reagents used in its preparation need not contain halogen.

In accordance with the instant invention, it has been discovered that a mono conjugated diene magnesium and an allyl halide react to produce a complex Grignard reagent RMgX which contains halide X in the molecule, and undergoes conventional Grignard reactions. Thus, by oxygenation and hydrolysis the Grignard compound can be converted to the corresponding alcohol.

The allyl halide

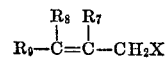

reacts so as to add an allyl group to a carbon of one of the ethylene double bonds of the conjugated diene. Thus, it can add to any of four positions in the diene. The halogen adds to magnesium, which becomes bonded to the other carbon of that ethylenic double bond, in a normal 1,2-addition, or possibly to a carbon of the other ethylenic double bond of the diene, by 1,4-addition. The result is a complex group of isomers.

To illustrate the reaction, and for simplicity, designating the allyl halide as RX, the major possible reaction products are as follows:

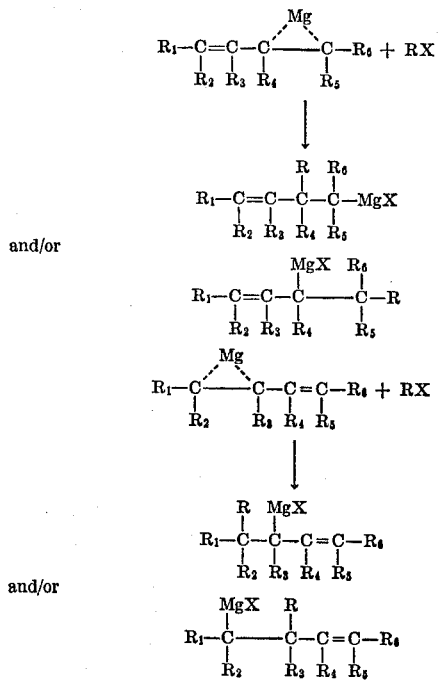

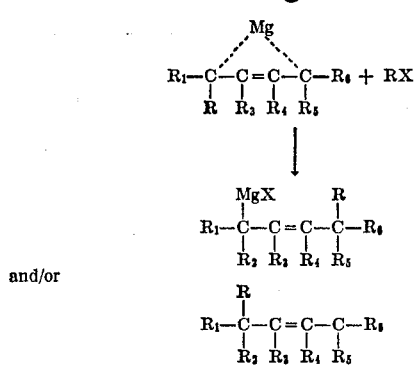

and/or

In the above formulae, $R_1$, $R_2$, $R_3$, $R_4$, $R_5$, $R_6$, $R_7$, $R_8$, and $R_9$ are hydrocarbon groups, or hydrogen. The hydrocarbon groups can have from one to about fifty carbon atoms, and can be straight chain or branched. They can be saturated or unsaturated, and alicyclic or cyclic in structure. Exemplary hydrocarbon groups are alkyl, alkenyl, aryl, cycloalkyl and cycloalkenyl, alkylaryl, arylalkyl, cycloalkylalkyl and alkylcycloalkyl groups.

Exemplary hydrocarbon groups include methyl, ethyl, propyl, isopropyl, butyl, isobutyl, secondary butyl, tertiary butyl, amyl, isoamyl, secondary amyl, tertiary amyl, hexyl, isohexyl, 2-ethylhexyl, secondary hexyl, tertiary hexyl, heptyl, isoheptyl, octyl, nonyl, decyl, myristyl, stearyl, allyl, butenyl, pentenyl, hexenyl, heptenyl, octenyl, nonenyl, oleyl, ricinoleyl, linooleyl, cyclohexyl, cyclobutyl, cyclopentyl, cyclopropyl, cycloheptyl, cyclooctyl, cyclododecyl, cyclopentenyl, cyclohexenyl, cycloheptenyl, phenyl, benzyl, xylyl, ethylphenyl, methylphenyl, octylphenyl, dodecylphenyl, naphthyl, anthracyl, phenethyl, phenpropyl, and phenbutyl.

The halide X can be chlorine, bromine or iodine. The chloride is preferred; the bromide is more reactive, but also more expensive; the iodide is more difficult to work with.

The Grignard reagents obtained in accordance with this reaction undergo the conventional reactions of Grignard reagents. They will, for example, react with ketones, aldehydes, esters, acid anhydrides, cyanides, $CO_2$, and alkylene oxides in Grignard reactions to add substituent in the molecule. Oxidation of the Grignard reagent with oxygen followed by hydrolysis results in the corresponding alcohol. Consequently, these Grignard reagents afford a route to diene aldehydes, ketones, esters, γ-keto acids, hydrocarbons, and alcohols of quite complex structure which would otherwise be difficult of access.

Exemplary is the reaction with oxygen followed by hydrolysis to form the alcohol:

II.

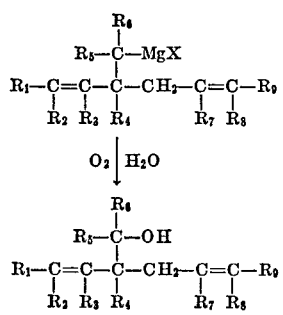

The mono conjugated diene magnesium can be obtained by reaction of metallic magnesium with any conjugated diene in the presence of a Lewis acid catalyst. This reaction is not *per se* a part of the instant invention, but is known, and is described, for instance in Japanese patent publication No. 3770/1971 to Tatsuo Moroe et al., published Jan. 29, 1971. Reference should be made to this reference for full details of the procedure used.

The reaction proceeds with any conjugated diene. The simplest conjugated diene is butadiene. Other conjugated dienes which can be used include 1,1-dimethyl butadiene, 2,3-dimethyl butadiene; isoprene, pentadiene-1,3; hexadiene-1,3; 2,3-dimethyl hexadiene-1,3; heptadiene-1,3; octadiene-1,3; 2-methyl-6-methylene-octadiene-2,7; nonadiene-1,3; decadiene-1,3; undecadiene-1,3; myrcene; 2,6-dimethyl nonatriene-2,6,8; hexatriene-1,3,5; heptatriene-1,3,5-; octatriene-1,3,5; nonatriene-1,3,5; decatriene-1,3,5; and undecatriene-1,3,5.

The magnesium metal can be used in any form, but it is preferably finely divided, such as magnesium turnings, magnesium beads, and magnesium powder. Magnesium sheet and ribbon can also be used. The magnesium can be activated prior to reaction by treating with an alkyl bromide or iodide, such as ethyl bromide or iodide, at a temperature from about 25 to about 200° C. in the organic ether or other solvent in which the reaction is to be carried out.

The Lewis acid catalysts are also known. Any Lewis acid can be used, such as the halides, acetates, nitrates and alcoholates of polyvalent metals of Groups I–B, II–B, III–A, III–B, IV–A, IV–B, V–A, V–B, VI–A, VI–B, VII–A, VII–B and VIII of the Periodic Table. Exemplary are titanium tetrachloride, arsenic trichloride, antimony pentachloride, zinc chloride, aluminum chloride, cupric chloride, nickel chloride, palladium chloride, ferric chloride, stannic chloride, ferric nitrate, cupric acetate, ether complex of boron trifluoride, and aluminum isopropylate.

The reaction is carried out in an anhydrous cyclic or aliphatic ether solvent, such as ethyl ether, dioxane, tetrahydrofuran, 1,2-dimethoxy ethane, 2-methyl-tetrahydrofuran, and the polyoxyalkylene glycol ethers, such as diethyl ether of ethylene glycol, dimethyl ether of ethylene glycol, diethyl ether of diethylene glycol, diethyl ether of triethylene glycol, and dipropyl ether of propylene glycol.

The reaction is carried out using approximately equimolar proportions of conjugated diene and metallic magnesium, and from 0.05 to 0.1 mole of Lewis acid per mole of magnesium.

The conjugated diene, magnesium, Lewis acid and solvent are mixed together and heated until the magnesium has disappeared showing reaction is complete. From four to seven hours will suffice, at from 50 to 80° C. The mixture is maintained under an inert atmosphere during the reaction and water is excluded. Usually it is necessary to activate the magnesium by use of ethyl bromide, ethylene dibromide or similar reactive halides in very small amounts.

The resulting mono (conjugated diene) magnesium compound can then be reacted with allyl halide without any intervening separation or purification steps.

The process of the invention is applicable to any allyl halide RX such as allyl chloride, allyl bromide, allyl iodide, methallyl bromide, methallyl chloride, methallyl iodide, crotyl chloride, crotyl bromide, crotyl iodide, 2,3-dimethyl allyl chloride, 2,3-dimethyl allyl bromide, 2,3-dimethyl allyl iodide, 3,3-diethyl allyl chloride, 3,3-diethyl allyl bromide, 3,3-diethyl allyl iodide, prenyl chloride, isoprene hydrobromide, isoprene hydroiodide, butadiene hydrochoride, butadiene hydrobromide, butadiene hydroiodide, 3-butyl-allyl chloride, 3-butyl-allyl bromide, 3-phenyl-allyl chloride, 3-phenyl-allyl bromide, 3-cyclohexyl-allyl chloride, 3-cyclohexyl-allyl bromide, 3-cyclopentyl-allyl chloride, 3-cyclopentyl-allyl bromide, and 3-stearyl-allyl chloride.

The reaction with allyl halide proceeds in the presence of the same organic aliphatic or cyclic ether used as a reaction solvent in forming the mono-(conjugated diene) magnesium compound reactant.

The process of the invention is of particular interest for the preparation of lavandulol, 2,6-dimethyl-5-oxymethyl-heptadiene-2,6, which can be obtained by reaction of monoisoprene magnesium and isoprene hydrochloride to form the Grignard reagent, followed by oxidation and hydrolysis of the Grignard reagent to form lavandulol, in accordance with the following scheme:

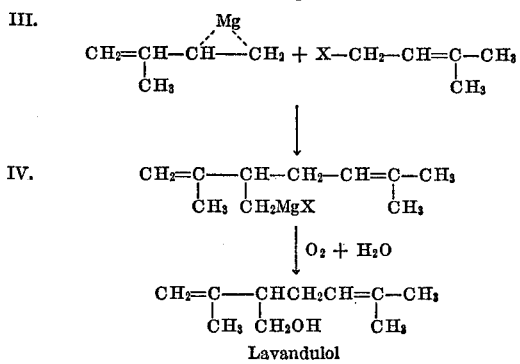

Lavandulol

Lavandulol was isolated by Schinz and co-workers from lavandula vera oil. The procedure used is described by Schinz in *The Perfumery and Essential Oil Record 37* 167–169 (July, 1946) summarizing the previous technical papers: Schinz and Seidel, *Helv.* 25 1572 (1942); Schinz and Bourquin, *Helv.* 25 1591 (1942); Seidel, Schinz and Muller, *Helv.* 27 664 (1944); Schniz and Muller, *Helv.* 27 57 (1944); Schinz and Simon, *Helv.* 28 774 (1945); further Diss. Bourquin E.T.H. Zurich, as well as Diss. Simon E.T.H. (1946). The alcohol prepared by Ruzicka and Roethlisberger, *Helv.* 18 439 (1935) is the racemic form of lavandulol, admixed with other isomers.

Lavandulol is a quite interesting terpenic alcohol which until now has been difficult of access, and consequently quite expensive, much more expensive than geraniol, to which it is similar, but in many respects more desirable for use in perfumery. Lavandulol is more stable than geraniol. The smell of the free alcohol is similar to that of geraniol, only somewhat more herby. Its acetate has a strong and strikingly fresh smell, and in this respect is markedly different from geranyl acetate. Lavandulyl methyl butyrate has a herbaceous tea-like, clary, sage-like odor, which is very tenacious, and is therefore useful in artificial oils and new types of fragrances. Lavandulol itself can be used in artificial bergamot and lavender oils, and in synthetic forms of various essential oils.

The syntheses used by Schinz and co-workers in preparing lavandulol are not suitable for low-cost large-scale production. In one case, lavandulol is made from isoprene.

By substitution of appropriate mono (conjugated diene) magnesium compounds and allyl halides, it is possible to prepare other terpenic alcohols of complex structure, similar to or isomeric to lavandulol.

In the process of the invention, it is quite important that the reaction system be maintained anhydrous, and that the magnesium be reacted first with the conjugated diene and then with the allyl halide. If, for example, a Grignard reagent is prepared from the magnesium and allyl halide, and it is then attempted to react this Grignard reagent with a conjugated diene, the reaction of the invention does not occur. It appears, therefore, that the allyl halide reacts directly with the mono conjugated diene magnesium compound, resulting in insertion of the allyl group in the mono conjugated diene magnesium compound, and migration of the halide to the magnesium, and the formation of the Grignard reagent.

The reaction in forming the Grignard reagent of the invention also has to be carried out at a high enough temperature to impart sufficient reactivity to the mono (conjugated diene) magnesium and/or the intermediate complex or radical. A temperature within the range from about 5° to about 200° C. is sufficient. On the other hand, it is necessary to avoid an excess of the allyl halide in the reaction mixture in the course of the reaction, because otherwise excess coupling of the allyl halide may take place yielding diallyl conjugated diene hydrocarbons instead of the allyl halide's reacting and becoming incorporated in the conjugated diene complex.

The formation of the Grignard reagent requires stoichiometric amounts of the mono (conjugated diene) magnesium and allyl halide, mole per mole. However, an excess of the mono (conjugated diene) magnesium can be used, to promote the reaction of the allyl halide to form the Grignard reagent. This excess can be within the range from about two to about ten times the stoichiometric amount, preferably from about two to about three times the stoichiometric amount.

The cyclic ether provides the reaction medium in which the reaction takes place, and also permits control of reaction temperature to the reflux temperature of the solvent at the pressure used. If the reaction temperature is to be in excess of the reflux temperature of the cyclic ether, it will be necessary to use a closed vessel and/or apply external pressure. The higher the reaction temperature, the higher the reaction rate, and it is therefore frequently desirable to carry out the reaction in a closed vessel under pressure.

In general, the amount of cyclic ether is within the range from about 50 to about 1,000 ml. per mole of conjugated diene and allyl halide. The preferred amount is within the range from about 250 to about 600 ml.

After formation of the Grignard reagent, the reaction mixture can be cooled to room temperature or below, and can then be stored until needed, while maintaining it anhydrous.

Hydrolysis of the Grignard reagent of the invention with water or acid permits recovery of the condensation product of the conjugated diene and allyl halide in the form of a non-conjugated diene hydrocarbon:

VI.

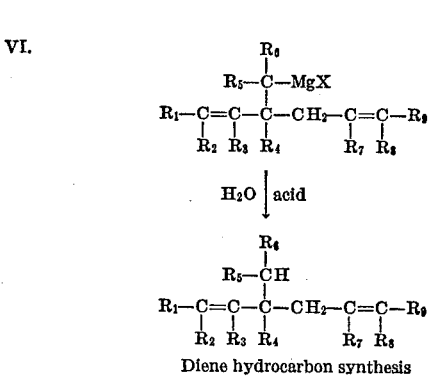

Diene hydrocarbon synthesis

Oxygenation of the Grignard reagent of the invention, by reaction with molecular oxygen followed by hydrolysis with an acid or water, results in the isolation of the corresponding alcohol as shown in schemes II and III, above, the alcohol being substituted at the position previously held by the MgX of the Grignard reagent.

Oxygenation of the Grignard reagent of the invention can be carried out by permitting an equivalent amount of oxygen to react therewith at room temperature, or at an elevated temperature. Temperatures within the range from about 5° C. to about 150° C. can be used. The oxygen can be introduced as pure oxygen gas, or in admixture with others gases, inert to the Grignard reagent, such as, for example, nitrogen. Air can also be used, and is usually the cheapest and most available source. Pure oxygen, however, may provide a more rapid oxidation reaction.

The Grignard reagent can also be reacted with compounds reactive with Grignard reagent in conventional Grignard syntheses, such as: carbon dioxide, to form the corresponding acid; dialkyl formamide or a nitrile to form the corresponding aldehyde or ketone; formaldehyde or a higher aldehyde, a ketone, or an alkylene oxide, to form a higher alcohol; cyclic acid anhydride to form a γ-keto acid (the resulting product is recovered using conventional techniques); according to the following reactions:

VII.
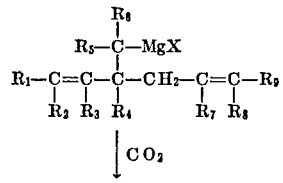
$$\downarrow CO_2$$
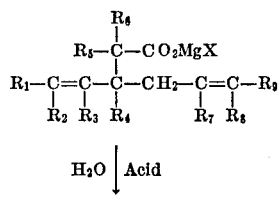
$$H_2O \mid Acid$$
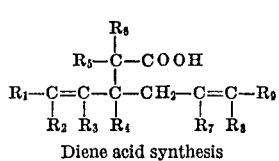
Diene acid synthesis VIII.
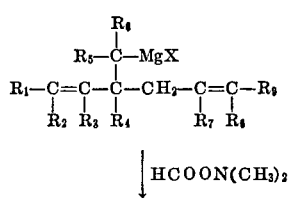
$$\downarrow HCOON(CH_3)_2$$
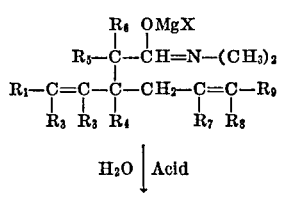
$$H_2O \mid Acid$$
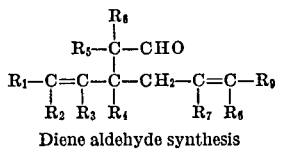
Diene aldehyde synthesis IX.
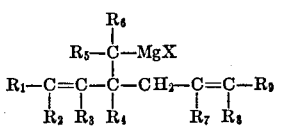
$$\downarrow RCN$$
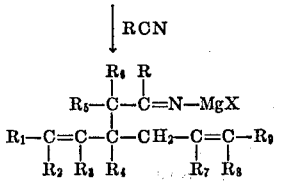
$$H_2O \mid Acid$$
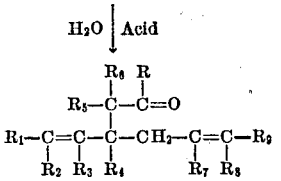
Diene ketone synthesis X.
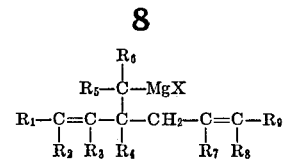
$$HCHO \downarrow$$
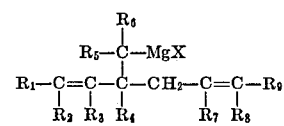
$$H_2O \mid Acid$$
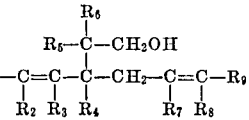

Next higher diene primary alcohol synthesis

XI.
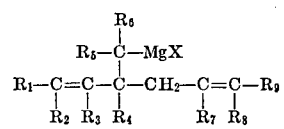
$$\downarrow RCHO$$
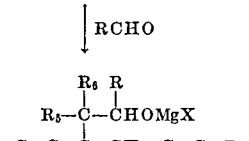
$$H_2O \mid Acid$$
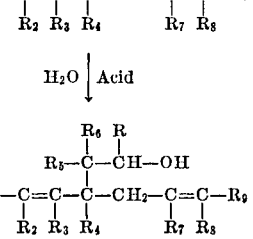

Higher diene secondary alcohol synthesis

XII.
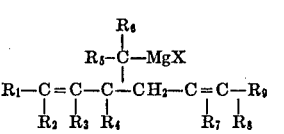
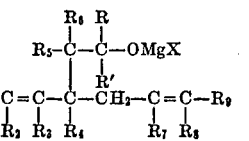
$$H_2O \mid Acid$$
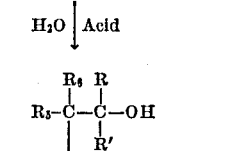

Higher diene tertiary alcohol synthesis

XII.

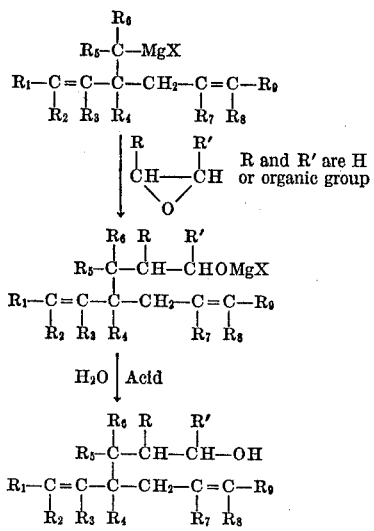

Two CH₂ higher diene primary or secondary alcohol synthesis

XIV.

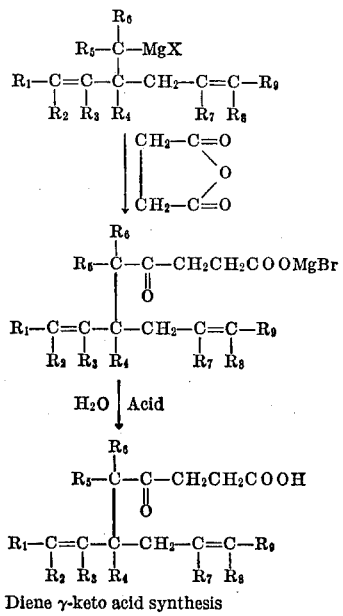

Diene γ-keto acid synthesis

These are conventional reactions of Grignard reagents, and are carried out under the usual conditions, in the solvent solution in which the Grignard reagent of the invention is formed.

The following Examples in the opinion of the inventor represent preferred embodiments of the invention:

EXAMPLE 1

Magnesium metal (70–80 mesh, 24.0 g.), isoprene (0.88 mole, 60 g.), and 400 ml. of tetrahydrofuran were stirred and heated at reflux for 7 hours under nitrogen, and cooled. Then 1.0 ml. of ethyl bromide was added, and the mixture was heated at reflux (63 C.) for 7 hours. To this mixture, after it was cooled to room temperature (27–30° C.), was slowly added 3,3-dimethylallyl chloride (prenyl chloride) (0.88 mole, 92 g.) over a period of 4½ hours during which time the temperature rose to 58° C. (4 hours) and fell to 43° C. (4½ hours). This mixture was stored under nitrogen for one month, and then oxidized by replacing 20% of the nitrogen atmosphere in the flask by pure oxygen, attaching a reservoir of oxygen and thus replacing the oxygen as it was absorbed by the stirred mixture. There was a slow uptake of oxygen for 10 minutes, then a halt for 30 minutes, followed by a rapid uptake for 32 minutes. Total consumption of oxygen was 12.2 liters, close to the theory (12.2 S.T.P.).

The mixture was added to 1000 ml. of water soln. contg. 85 ml. of conc. HCl. The layers were separated, and the organic layer was dried over 10 g. of anhydrous sodium carbonate, and then stripped of solvents under vacuum (40 mm. approx. pressure), followed by a heads cut under about 15–8 mm. pressure. The final material was distilled under a pressure of 0.8 mm. to a pot temperature of 220° C., and a final vapor temperature of 188° C. Six fractions were obtained, with a weight of 103.3 g. (67.3% yd.), a residue of 2.0 g. and two heads fractions from a fractionation of the heads cut of 8.8 g. and 1.7 g.

Gas-liquid chromatographic analysis showed that fractions 2 and 3 (of the 6 fractions) contained 66.5 and 87%, respectively, of lavandulol.

EXAMPLE 2

A solution of one mole of mono isoprene magnesium was prepared from one mole of isoprene, one gram atom of magnesium and 600 ml. of tetrahydrofuran solvent. To this solution was added one mole of isoprene hydrochloride (3,3-dimethylallyl chloride) over a period of three hours with the temperature gradually rising (as addition proceeded) from 27° C. to 67° C. The mixture was stirred for 3½ hours longer and let stand overnight.

Then, the Grignard was oxidized by use of a 20% oxygen 80% nitrogen mixture with the admittance of free oxygen as it was absorbed. A total of 11.5 liters (94.5% of theory) of pure oxygen was consumed in two hours at 18–28° C. The mixture was acidified by adding to 1000 ml. of $H_2O$ containing 100 ml. of concentrated HCl. From this the organic layer was separated and the water layer was extracted twice with 200 ml. portions of petroleum ether. The organic layer and the extracts were combined and stripped of solvents. A small sample of the concentrate, 17.6 g., was held aside and the remainder was vacuum distilled to yield 7 fractions and a residue:

TABLE I

|  | Weight, grams | Vapor temperature | Pressure, mm. |
|---|---|---|---|
| Start distillation | | 60 | 0.6 |
| Fraction: | | | |
| 1 | 10.7 | 78 | 0.4 |
| 2 | 12.1 | 90 | 0.3 |
| 3 | 24.5 | 95 | 0.2 |
| 4 | 22.3 | 101 | 0.2 |
| 5 | 25.2 | 97 | [1] 0.2 |
| 6 | 20.0 | 109 | 0.4 |
| 7 | 17.2 | 128 | 0.2 |
| Residue | 35.4 | | |
| Total weight | 167.4 | | |
| Hold out | 17.6 | | |
| Total | [2] 185.0 | | |

[1] Most boiled 94–95.
[2] Theory 222.

The fractions were analyzed by gas liquid chromatographic analysis, and the results are given in Table II.

TABLE II

|  | Weight | Percent $C_{10}$ | $C_{15}$ above— | Percent lavandulol |
|---|---|---|---|---|
| Fraction: | | | | |
| 1 | 10.7 | 86 | 14 | 46.3 |
| 2 | 12.1 | 58.2 | 41.8 | 33.3 |
| 3 | 24.5 | 11.7 | 88.3 | 6.8 |
| 4 | 22.3 | 0 | 100 | 0 |
| 5 | 25.2 | 0 | 100 | 0 |
| 6 | 20.0 | 0 | 100 | 0 |
| 7 | 17.2 | 0 | 100 | 0 |
| Residue | 35.4 | 0 | 100 | 0 |
| Percent $C_{15}$'s in all | | 11.3 | ([1]) | ca. [2] 6.4 |

[1] $C_{15}$'s 88.7%.
[2] Total yield of lavandulol.

Although there were 10–12 peaks in the $C_{15}$ range, 3 to 4 predominate, indicating a high degree of stereo selectivity.

EXAMPLES 3 AND 4

Magnesium (24.3 g., 1 mole), isoprene (60 g., 0.88 mole), cupric chloride (Example 3) or ferric chloride (Example 4) (4.0 g.) and tetrahydrofuran solvent (400 ml.) were added to a 1000 ml. flask, fitted with thermometer and reflux condenser. Ethyl bromide (1 ml.) was added and the mixture was rapidly heated to reflux (60° C.). The temperature rose to approx. 67° C. during the 20 hour refluxing. Upon cooling, isoprene hydrochloride (92 g., 0.88 mole) was added dropwise. A rise in temperature to approx. 70° C. accompanied the addition. The reaction was run under a static nitrogen atmosphere, and stirred magnetically.

Oxidation of the Grignard product was accomplished with a 20% oxygen/80% nitrogen gas mixture. The oxidation product was hydrolyzed and distilled.

EXAMPLE 3

FeCl₃ Reaction:
 (a) Total yield lavandulol—0.7%
 (b) Total yield C₁₀ alcohols—7.3%
 Pk II 0.7% yield; Pk IV 0.2%; Pk I 0.2%; Geraniol+nerol approx. 0.4% yield.

EXAMPLE 4

CuCl₂ Reaction:
 (a) Total yield lavandulol—1.8%
 (b) Total yield C₁₀ alcohols—14.2%
 Geraniol+nerol approx. 0.2%; Pk II 0.4%; Pk III 0.4%; Pk I 0.3%.

Having regard to the foregoing disclosure, the following is claimed as the inventive and patentable embodiments thereof:

1. A process for preparing a Grignard reagent which comprises reacting mono (conjugated diene) magnesium and an allyl halide in an organic ether solvent under anhydrous conditions at a temperature within the range from about 5° to about 200° C., at a molar ratio of mono (conjugated diene) magnesium:allyl halide within the range from about 1:1 to about 10:1, the mono (conjugated diene) magnesium having the formula:

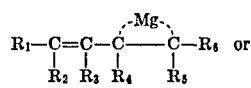

or

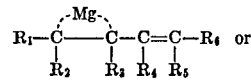

or

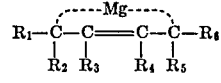

and the allyl halide having the formula

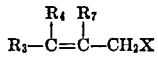

wherein $R_1$, $R_2$, $R_3$, $R_4$, $R_5$, $R_6$, $R_7$, $R_8$ and $R_9$ are selected from the group consisting of hydrogen and hydrocarbon groups having from one to about fifty carbon atoms, and X is selected from the group consisting of chloride, bromide and iodide.

2. A process according to claim 1, in which the allyl halide is prenyl chloride.

3. A process according to claim 1, in which the hydrocarbon groups are selected from the group consisting of alkyl, alkenyl, aryl, cycloalkyl, cycloalkenyl, alkylaryl, arylalkyl, cycloalkylalkyl and alkylcycloalkyl groups.

4. A process according to claim 1, in which the Grignard reagent has the formula

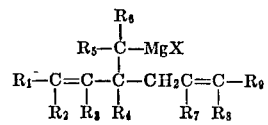

5. A process according to claim 4, in which the conjugated diene is isoprene and the allyl halide is prenyl chloride.

6. A process according to claim 1, in which the organic ether solvent is selected from the group consisting of aliphatic and cyclic ethers.

7. A process according to claim 1, in which the cyclic ether is tetrahydrofuran.

8. A process according to claim 1, in which the magnesium is reacted with the conjugated diene in an organic ether solvent and the allyl halide added to the resulting reaction mixture.

9. A process according to claim 1, in which the allyl halide is added to a mixture of mono (conjugated diene) magnesium and Lewis acid in the organic ether solvent.

10. A process according to claim 1, in which the reaction is carried out at the reflux temperature of the organic ether used as the solvent, with addition of allyl halide during reflux of the reaction mixture.

11. A process according to claim 1, in which the amount of organic ether is within the range from about 50 to about 1,000 ml. per mole of conjugated diene and allyl halide.

References Cited

UNITED STATES PATENTS

| | | | |
|---|---|---|---|
| 3,161,689 | 12/1964 | Cooper et al. | 260—665 G |
| 3,168,582 | 2/1965 | Aufdermarsh | 260—665 G |
| 3,388,179 | 6/1968 | Ramsden | 260—665 G |
| 3,597,488 | 8/1971 | Shepherd | 260—665 G |
| 3,711,560 | 1/1973 | Ramsden | 260—665 G |

OTHER REFERENCES

Coates et al., Principles of Organometallic Chemistry, 1968, Methion & Co., London, p. 20–21.

DANIEL E. WYMAN, Primary Examiner

A. P. DEMERS, Assistant Examiner

U.S. Cl. X.R.

260—526 N, 566 R, 593 R, 601 R, 604 R, 632 R, 666 A

UNITED STATES PATENT OFFICE
CERTIFICATE OF CORRECTION

Patent No. 3,819,733  Dated June 25, 1974

Inventor(s) Hugh E. Ramsden

It is certified that error appears in the above-identified patent and that said Letters Patent are hereby corrected as shown below:

Column 3, line 4 : "R" should be $--R_2--$.

Column 8, line 50-56: " XII. 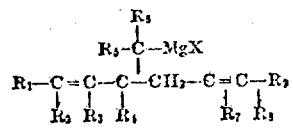 "

should be

-- XII. 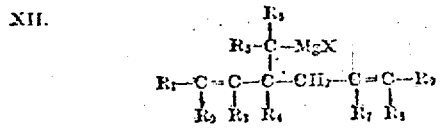 --

Column 9, line 1 : "XII" should be --XIII--.

Signed and Sealed this twenty-fourth Day of February 1976

[SEAL]

Attest:

RUTH C. MASON
Attesting Officer

C. MARSHALL DANN
Commissioner of Patents and Trademarks